UNITED STATES PATENT OFFICE.

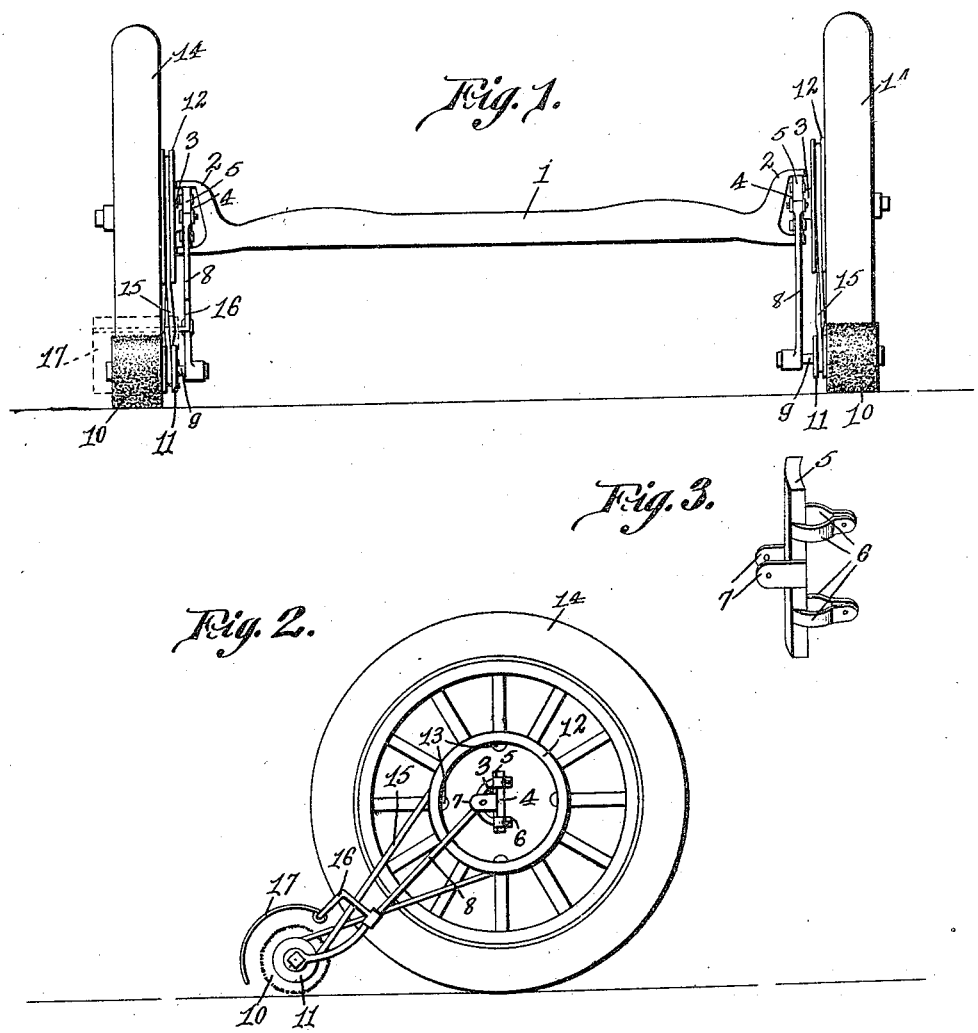

ABRAHAM LAPEDES, OF NEW YORK, N. Y.

SWEEPER ATTACHMENT FOR MOTOR-VEHICLES.

1,268,585. Specification of Letters Patent. Patented June 4, 1918.

Application filed June 27, 1917. Serial No. 177,386.

*To all whom it may concern:*

Be it known that I, ABRAHAM LAPEDES, a citizen of the United States, residing at New York, in the county of New York and State of New York, have invented a new and useful Sweeper Attachment for Motor-Vehicles, of which the following is a specification.

The subject of this invention is a sweeper attachment for motor vehicles, and the objects of the invention are, first, to provide means for cleaning the path to be passed over by the wheels, second, to provide a revolving brush hung in front of each wheel and driven by the motion of the wheel, third, to provide a simple and efficient sweeping attachment.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

A practical embodiment of the invention is shown in the accompanying drawing, wherein:—

Figure 1 is a front elevation of a sweeper constructed in accordance with the present invention shown attached to the front wheels of an automobile;

Fig. 2 is a side elevation of the same attached to a wheel which has been detached from the stationary axle;

Fig. 3 is an enlarged perspective view of an attaching plate.

Referring to the drawings by numerals of reference:—

The usual axle of an automobile is indicated at 1, and this axle is provided with the yoke ends 2. Stub axles 3 are provided and on the inner end of each stub axle is formed a hollow spindle 4, which turns on a pin in the yoke 2.

A suitable connecting means is formed on, or attached to the spindle, such means being herein shown as a plate 5, adapted to extend longitudinally of and curved to conform to the contour of the spindle 4. The plate 5 is formed with opposed curved arms 6 spaced along each longitudinal edge thereof, and adapted to embrace the spindle 4, and each arm has an outturned end which is apertured to receive a bolt, or other fastening means, by which it is secured to its companion end to bind the plate in place upon the spindle.

Lugs 7 project from opposed points on the longitudinal edges of the plate 5 and these lugs are apertured to receive a pin upon which is pivotally mounted, between the lugs, a bracket arm 8. Bracket arm 8 has a stub shaft 9, which may be integral therewith or attached thereto, extending laterally in one direction from its free end. On the stub shaft 9 turns a rotary brush 10 which has a grooved pulley 11 integral with or rigidly affixed to its hub.

A grooved rim 12 is secured through lugs 13, or otherwise, to the automobile wheels 14, and over this rim and the pulley 11, passes a crossed belt 15, through which motion is transmitted from the automobile wheel to the brush. While the gearing has been herein described as consisting of grooved pulleys and a round belt, it is understood that any convenient and efficient form of gearing may be used to transmit motion from the wheel to the brush.

An angled bracket arm 16 may be secured to the bracket arm 8 for the purpose of supporting a shield or guard 17 above the brush 10, for the purpose of preventing particles, projected by the brush, entering the vehicle.

In practice the device operates in the following manner: The device is attached to the vehicle as hereinbefore described. As the vehicle runs along the road, motion is imparted to the brushes 10 which will cause them to sweep a path in front of the vehicle wheel thereby removing tacks, broken glass and other deleterious matter from the path of the wheel. As the bracket arm 8 is pivoted to swing vertically, the brush will accommodate itself to the rise and fall of the road bed, and since the parts are secured to an integral part of the stub axle, the brush will follow the motion of the wheel in steering.

Having thus described the invention, what is claimed as new and sought by Letters Patent, is:—

A sweeper attachment for motor vehicles, comprising a plate attachable to the vehicle, an arm pivoted to the plate and formed with an angled outer end, a brush journaled on the angled end, an angle bracket extending laterally from the arm, a guard on the bracket arm and overlying the brush, and means for rotating the brush.

In testimony that I claim the foregoing as my own, I have hereto affixed by signature in the presence of two witnesses.

ABRAHAM LAPEDES.

Witnesses:
M. D. BECK,
AUGUSTA KRONEMEYER.

Copies of this patent may be obtained for five cents each, by addressing the "Commissioner of Patents, Washington, D. C."